US012036522B2

(12) United States Patent
Rosenauer et al.

(10) Patent No.: US 12,036,522 B2
(45) Date of Patent: Jul. 16, 2024

(54) MONITORING METHOD AND APPLICATION DEVICE FOR A MULTI-COMPONENT VISCOUS MATERIAL

(71) Applicant: Atlas Copco IAS GmbH, Bretten (DE)

(72) Inventors: Tobias Rosenauer, Eberdingen-Nussdorf (DE); Christian Kammerer, Knittlingen-Hohenklingen (DE); Erich Lehner, Bad Friedrichshall (DE)

(73) Assignee: Atlas Copco IAS GmbH, Bretten (DE)

( * ) Notice: Subject to any disclaimer, the term of this patent is extended or adjusted under 35 U.S.C. 154(b) by 146 days.

(21) Appl. No.: 17/630,220

(22) PCT Filed: Jun. 16, 2020

(86) PCT No.: PCT/EP2020/066596
§ 371 (c)(1),
(2) Date: Jan. 26, 2022

(87) PCT Pub. No.: WO2021/023419
PCT Pub. Date: Feb. 11, 2021

(65) Prior Publication Data

US 2022/0274076 A1 Sep. 1, 2022

(30) Foreign Application Priority Data

Aug. 7, 2019 (DE) ..................... 10 2019 121 347.9

(51) Int. Cl.
*B01F 35/21* (2022.01)
*B01F 25/4314* (2022.01)
(Continued)

(52) U.S. Cl.
CPC .... *B01F 35/2113* (2022.01); *B01F 25/43141* (2022.01); *B01F 35/71805* (2022.01);
(Continued)

(58) Field of Classification Search
CPC ............ B01F 35/2113; B01F 35/71805; B01F 25/43141; B01F 2101/2305; B05C 11/1013
See application file for complete search history.

(56) References Cited

U.S. PATENT DOCUMENTS 5,481,260 A * 1/1996 Buckler ................ B05C 5/0225 340/614
5,808,559 A 9/1998 Buckler
(Continued)

FOREIGN PATENT DOCUMENTS

DE 695 07 695 T2 6/1996
DE 101 58 335 C1 6/2003
(Continued)

OTHER PUBLICATIONS

English translation of the International Preliminary Report on Patentability in PCT/EP2020/066596, dated Feb. 10, 2022.
(Continued)

*Primary Examiner* — Jeremy Carroll
(74) *Attorney, Agent, or Firm* — Collard & Roe, P.C.

(57) ABSTRACT

A method monitors a device for applying an at least two-component viscous material to workpieces, including a metering unit having a number of metering valves corresponding with the number of viscous material components, and a static mixer detachably secured to the metering unit for component blending. The static mixer has a material inlet facing the metering unit and a material outlet facing away from the metering unit. Each metering valve has a supply channel sealingly connectable to a valve seat for supplying the respective component to the static mixer. A number of material applications are carried out consecutively, each having an identical predetermined time between start and end of the application. During the applications, between the start and the end, at predetermined times, the pressure in at
(Continued)

Figure 1:
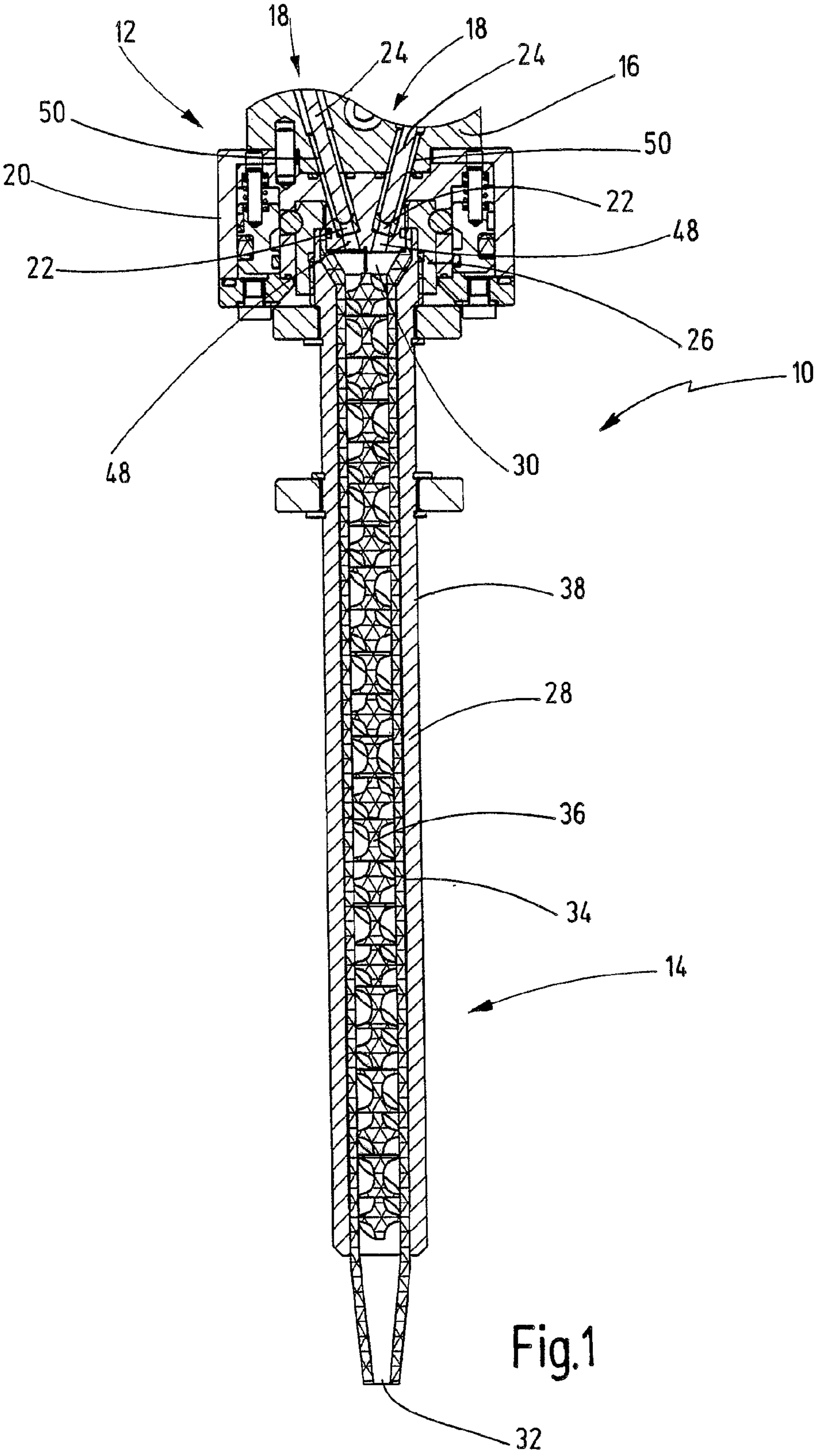

least one supply channel is measured by a pressure sensor and preferably measured in all supply channels by a respective pressure sensor.

10 Claims, 2 Drawing Sheets

(51) Int. Cl.

| | |
|---|---|
| ***B01F 35/71*** | (2022.01) |
| ***B01F 101/00*** | (2022.01) |
| ***B05C 11/10*** | (2006.01) |
| ***B05C 17/005*** | (2006.01) |
| *B01F 101/36* | (2022.01) |

(52) U.S. Cl.

CPC .... *B05C 11/1013* (2013.01); *B05C 17/00553* (2013.01); *B01F 2101/2305* (2022.01); *B01F 2101/36* (2022.01)

(56) References Cited

U.S. PATENT DOCUMENTS

| | | | | |
|---|---|---|---|---|
| 5,857,589 | A * | 1/1999 | Cline .................. | B05C 11/1005 222/63 |
| 6,064,536 | A | 5/2000 | Ebisawa et al. | |
| 6,220,747 | B1 | 4/2001 | Gosselin | |
| 6,387,303 | B1 | 5/2002 | Jones et al. | |
| 7,404,916 | B2 | 7/2008 | Begemann et al. | |
| 8,262,003 | B2 | 9/2012 | McGloughlin et al. | |
| 11,154,829 | B2 | 10/2021 | Pfeiler et al. | |
| 2002/0014496 | A1* | 2/2002 | Cline ...................... | B29B 7/728 222/1 |
| 2005/0098578 | A1 | 5/2005 | Szymanski | |
| 2014/0014686 | A1* | 1/2014 | Bacco ................. | B05C 11/1044 222/63 |
| 2015/0028051 | A1* | 1/2015 | Topf ...................... | B05C 5/0225 222/54 |
| 2016/0221024 | A1* | 8/2016 | Stupp ...................... | G01F 25/10 |

FOREIGN PATENT DOCUMENTS

| | | | |
|---|---|---|---|
| DE | 203 18 476 | U1 | 4/2004 |
| DE | 20 2005 016 396 | U1 | 12/2005 |
| DE | 10 2006 042 747 | A1 | 4/2007 |
| DE | 10 2009 038 924 | B3 | 2/2011 |
| DE | 10 2015 207 021 | B3 | 6/2016 |
| DE | 10 2018 119 838 | A1 | 2/2020 |
| EP | 0 599 104 | A1 | 6/1994 |
| EP | 1 437 210 | A1 | 7/2004 |
| EP | 2 246 705 | A1 | 11/2010 |
| EP | 2 806 145 | A1 | 11/2014 |
| WO | 97/24722 | A2 | 7/1997 |
| WO | 98/24722 | A2 | 6/1998 |
| WO | 99/43606 | A1 | 9/1999 |
| WO | 2006/003363 | A1 | 1/2006 |
| WO | 2017/167478 | A1 | 10/2017 |
| WO | 2019/083430 | A1 | 5/2019 |

OTHER PUBLICATIONS

International Search Report in PCT/EP2020/066596, dated Oct. 21, 2020.

German Search Report in DE 10 2019 121 347.9, dated Apr. 27, 2020, with English translation of relevant parts.

Observations by third party dated Jun. 21, 2022 in EP application No. 20736253.4.

Notice of Opposition against European Patent EP 3 983 135 dated Mar. 21, 2024 (with translation).

Letter from opponent requesting correction of D1 reference number dated Apr. 23, 2024 (with translation).

D15, D15a—Henkel KGaA, "Loctite Handbuch für Gerätetechnik {Loctite Manual for Equipment Technology}", 5th edition, 2015. [online], available at <https://web.archive.org/web/20160705074713/http://hybris.cms.henkel.com/medias/sys_master/root/hca/h69/9109250735158.pdf>(with screen shot).

D16—Henkel KGaA, "97152 Universal-Steuergerät Bedienungsanleitung {97152 Universal Control Device Operating Instructions}", Nov. 18, 2018. [online], available at <https://dm.henkel-dam./is/content/henkel/97152_OM_d_e_2018-11_8953703>.

FW1—Feldmann, K. et al. (Eds.), "Handbuch Fügen, Handhaben, Montieren {Handbook of Joining, Handling, Assembly}", Munich, Carl Hanser Verlag, 2014 (concise explanation of relevance provided in Mar. 21, 2024 Notice of Opposition).

* cited by examiner

MONITORING METHOD AND APPLICATION DEVICE FOR A MULTI-COMPONENT VISCOUS MATERIAL

CROSS REFERENCE TO RELATED APPLICATIONS

This application is the National Stage of PCT/EP2020/066596 filed on Jun. 16, 2020, which claims priority under 35 U.S.C. § 119 of German Application No. 10 2019 121 347.9 filed on Aug. 7, 2019, the disclosure of which is incorporated by reference. The international application under PCT article 21(2) was not published in English.

The invention relates to a method for monitoring an apparatus for application of an at least two-component viscous material to workpieces, and to an apparatus as disclosed herein.

An apparatus of this type is described, for example, in the German patent application 10 2018 119 838, which is not a prior publication. It has a static mixer, which blends a two-component or multi-component material, in that the components are introduced into it separately and blend on their own as they pass through the static mixer, i.e. through the blending spiral contained in it. At the material outlet, the blended material, for example a two-component adhesive, then exits, and hardens on the workpiece. The components are introduced into the material inlet of the static mixer separately from one another, by way of their respective supply channels, wherein they are metered by means of the metering valves. A typical cycle during application consists, for example, of first flushing a predetermined volume of material, which generally amounts to one-and-a-half times to two times the volume of the static mixer, into a waste container, so as to remove old material, which has partially already reacted and can no longer easily be used, from the static mixer. Subsequently, the static mixer is moved to the workpiece, and the material is applied to the workpiece. After the end of application, the workpiece is changed, wherein the workpiece coated with the viscous material is removed from the workpiece holder and replaced with an uncoated workpiece. Then the process starts again from the beginning, wherein the static mixer is first flushed, subsequently is moved to the workpiece, and then the material is applied to the workpiece.

The static mixers are wear parts that become clogged with material over the course of time, or can even burst in the event of great stress, so that the material application deviates from the ideal value. However, defects that influence the material application can also occur at the metering unit, for example if a supply channel is narrowed or clogged or if, during cleaning of the metering unit, material of the one component was wiped to the end of the supply channel of another component and hardened there together with the other material. Such defects are often not recognized in the case of fully automated application methods. Operating errors can also occur, for example such that the operating personnel forgets to insert a blending spiral into the static mixer being used, so that the components are not blended sufficiently and then do not harden sufficiently on the workpiece. Such defects are generally only recognized later, and the workpieces that were incorrectly coated are scrap.

It is therefore the task of the invention to make available a method for monitoring an apparatus for application of an at least two-component viscous material to workpieces, with which method the occurrence of defective material applications can be recognized at an early point in time.

This task is accomplished, according to the invention, by means of a method as disclosed herein. A further solution according to the invention consists of an apparatus having the characteristics as disclosed herein. Advantageous further developments of the invention are also disclosed.

The invention is based on the idea that a typical pressure progression always exists in the supply channels of the metering unit during material application, between the start of application and the end of application. Significant deviations from the typical pressure progression indicate a system error. This is particularly the case if, as preferred here, volume-controlled material application takes place, in which a predetermined volume of each component is introduced into the static mixer per time unit. If the static mixer bursts or if it is operated without a blending spiral, the pressures measured in the supply channels during material application are generally clearly lower than in the case of a typical material application. If the static mixer has become clogged with hardened material, the pressure in the supply channels is significantly higher than in the case of a typical material application. Even if one of the supply channels is narrowed, a clearly overly high pressure is measured in it. In this regard, the pressure values of the material applications can easily be compared with stored reference values. According to an advantageous further development of the invention, a test run is performed before startup of the application apparatus, during which run typical measured pressure values are taken. The values of each material application are compared with these values, wherein a significant deviation from the measured pressure values of the test run indicates an error that requires intervention.

It can be sufficient to measure the pressure in only one of the supply channels, not only during the test run but also during the material application. However, it is preferred that during the test run, the pressure is measured and documented in each of the supply channels by means of a pressure sensor, in each instance, at multiple predetermined measurement time points between the start of the test application and the end of the test application, and that during material applications, the pressure in each supply channel is measured between the start of the material application and the end of the material application, at the same predetermined points in time as during the test run, and that the measured pressure values of the material applications in each of the supply channels are compared with the corresponding measured pressure values of the test run. This corresponds to monitoring of all the supply channels, which brings more reliable results than monitoring of only one supply channel.

The measured pressure values measured in a supply channel during the material applications are always compared with the measured pressure value measured in the same supply channel during the test run, at the same point in time. The same point in time means the identical interval of the time point from the start of application during the material applications and from the start of the test application during the test run. In this regard, it is possible that the pressure in the corresponding supply channel during the test run and during the material application is measured at discrete time points, in each instance, so that only the measured pressure values measured at the discrete time points can be compared with one another. In this regard, it is preferred that the pressure in the corresponding supply channel during the test run and during the material application is measured at constant time intervals. However, it is also possible that the pressure in the corresponding supply channel is measured continuously, in each instance, during the test run and/or during the material application, so that a measured pressure value is measured at quasi infinitely many time points during every material application, which value can be compared with the corresponding measured value of the test run. A combination, in which the pressure is measured at discrete time points in the corresponding supply channel during the test run and continuously during the material application, or vice versa, is also possible.

It is preferred that the pressure in the corresponding supply channel is measured in the flow direction of the component in question, ahead of the valve seat. In this manner, constrictions in the region of the valve seat can also be recognized.

It is practical if a signal device is provided, which generates a warning signal if one or more measured pressure values of a material application deviate(s) from the corresponding measured pressure value(s) of the test run by more than a predetermined tolerance. In this manner, it is indicated to the operating personnel if an error occurs and the application apparatus must be checked. The warning signal can furthermore be varied as a function of the amount of the deviations, so as to indicate, for example, that only a slight deviation is occurring, which indicates that increased attention must be paid to monitoring, or that a clear deviation is occurring, which permits the conclusion of a significant error.

Figure 2:
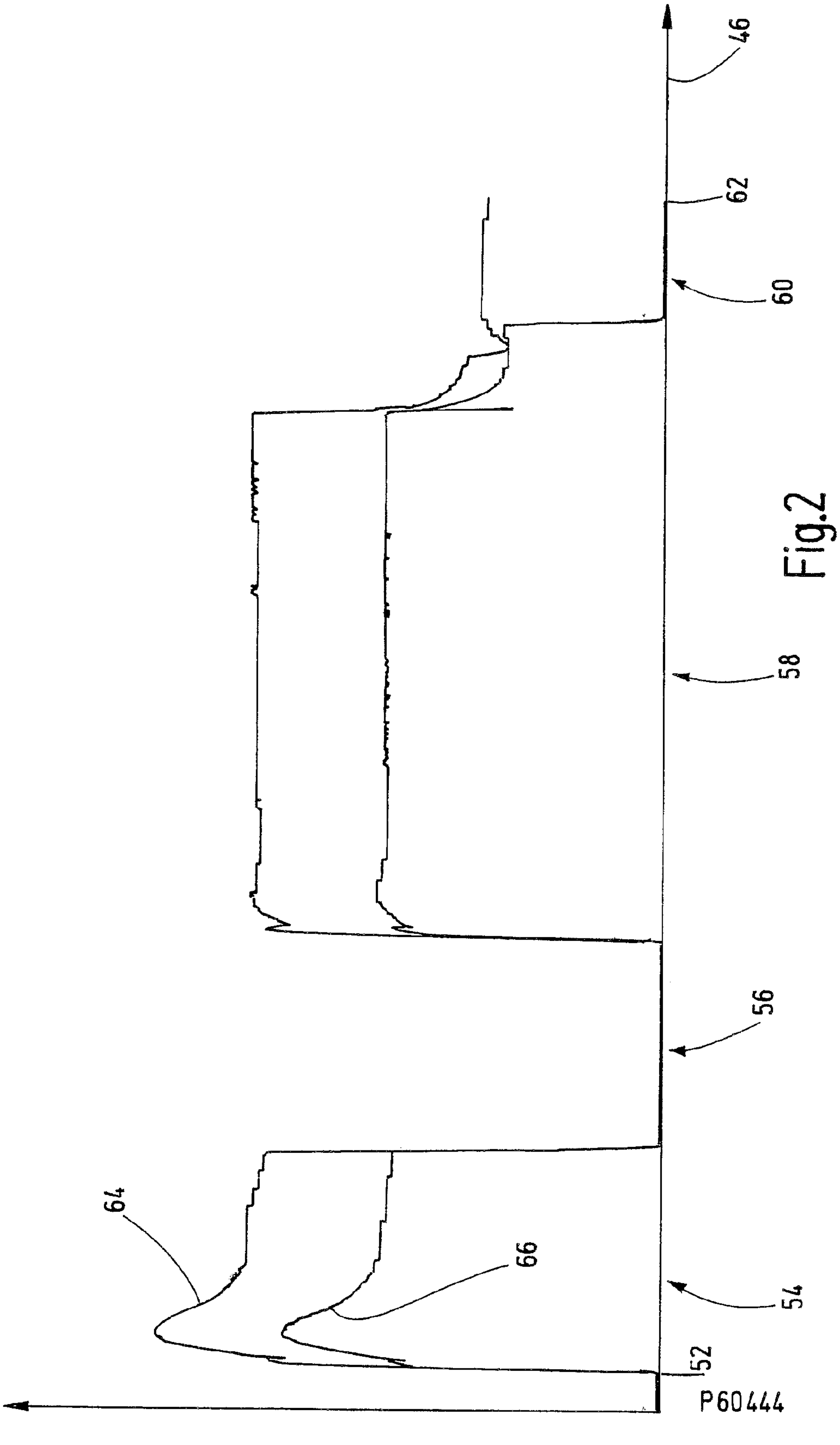

In the following, the invention will be explained in greater detail using an exemplary embodiment shown schematically in the drawing. This shows:

FIG. 1 an application apparatus for two-component viscous material in a partial representation in section, with a static mixer fixed in place on a metering unit, and FIG. 2 the pressure progressions in the supply channels of the apparatus according to FIG. 1, in the case of a typical material application.

The apparatus 10, shown in part in the drawing (FIG. 1), serves for application of a two-component adhesive to workpieces. It has a metering unit 12 as well as a static mixer 14, which unit is moved during the material application, relative to the workpieces, by means of a robot, not shown. The metering unit 12 has a valve block 16, only shown in part in FIG. 1, having two metering valves 18 that are configured as needle valves. Furthermore, the metering unit 12 has a coupling device 20, which is detachably and firmly connected with the valve block 16, and in which the valve seats 22 are arranged. The valve needles 24 extend into the coupling device 20, and open and close the metering valves 18 on the valve seats 22.

The static mixer 14 has a coupling part 26 that engages into the coupling device 20 and is detachably fixed in place on the latter. The static mixer 14 furthermore has a blending pipe 28 that extends from a material inlet 30 at its first end to a material outlet 32 at its second end. The blending pipe is widened at the material inlet 30 and communicates there with the metering valves 18. At the material outlet 32, it is conically narrowed. It has an inner pipe 34 that has the material inlet 30 and the material outlet 32, in which pipe a blending spiral 36 is arranged. Furthermore it has a support pipe 38 composed of metal, which extends over the major portion of the length of the inner pipe 34 and lies against the outer mantle surface of the latter. During application of the two-component adhesive, the two components (basic component and hardener) are each dispensed into the material inlet 30 by means of one of the metering valves 18, in a metered manner, and passed to the blending spiral 36. In the blending spiral 36, the two components blend on their way to the material outlet 32.

Two supply channels 48 run through the metering unit 12, which channels open into the material inlet 30, in each instance, and can be blocked and released at the valve seats 22, by means of the valve needles 24. Each of the supply channels 48 serves for supplying one of the two components. In each of the supply channels 48 there is a pressure sensor, not shown in detail, on the side of the corresponding valve seat 22 that faces away from the static mixer 14, in other words ahead of the corresponding valve seat 22 in the flow direction of the components, at the location indicated with the reference symbol 50, with which sensor the pressure in the corresponding supply channel 48 can be measured. The measured values of the pressure sensors 50 are evaluated in an evaluation device, not shown in any detail.

Application of the adhesive takes place with volume control, wherein a predetermined amount or a predetermined volume of each of the two components per time unit is always introduced into the static mixer 14. In FIG. 2, the pressure in the supply channels 48 is plotted over the time axis 46 for a typical material application. Such material applications are generally repeated identically, if a plurality of identical workpieces are being coated, with regard to the material flow in the supply channels 48, and therefore have essentially identical pressure progressions, as long as the apparatus 10 is not changed. According to FIG. 2, an application start 52 is followed by a flushing phase 54, during which the residual material is flushed from the static mixer 14 into a waste container. Accordingly, the pressure increases for a short time in both supply channels 48, until adhesive that has already been partially cross-linked or has hardened has been flushed out of the blending pipe 28. The flushing phase 54 is followed by a first waiting phase 56, during which the application apparatus 10 is moved to a workpiece, by means of robot, and during which the two metering valves 18 are closed. The first waiting phase 56 is followed by the application phase 58, during which the two metering valves 18 are open and material is applied to a workpiece. The application phase 58 is followed by a second waiting phase 60, during which the metering valves 18 are once again closed, so as to transport away the workpiece, which has been coated with adhesive, and to replace it with an uncoated workpiece, which phase ends at an application end 62. The second waiting phase 60, during which the basic component is still being pumped into the metering unit 12, so that its pressure curve 64 does not drop to zero, is then followed by the flushing phase 54 of a subsequent material application. In this regard, the pressure curve 64 of the basic component and the pressure curve 66 of the hardener are plotted above the time axis 46.

As long as the properties of the apparatus 10 do not change as the result of wear or clogging with hardened material, for example, and the predetermined volume streams have an identical time progression during every material application, the pressure curves 64, 66 plotted above the time axis 46 are identical, to a great extent, during every material application. The present invention makes use of this fact to monitor the material application. For this purpose, a test application of the material takes place before the first material application, which test serves to generate reference values. During the test application, material is applied to a test workpiece or simply just dispensed by the metering unit 12, for example into a waste container, between a test application start and a test application end, the time interval between which is identical with the interval between the application start 52 and the application end 62, wherein the volume streams of the components are controlled in such a manner that their time progression is identical with the time progression of the volume streams of the subsequent material applications. The pressure curves measured during the test run, which are not shown separately here, but essentially correspond to the pressure curves 64, 66 shown in FIG. 2, are stored in a data memory of the evaluation device. They serve as reference values with which the pressure curves 64, 66 of the subsequent material applications are compared. In this regard, the pressures measured in the supply channels 48 are compared with the pressure measured at the same time point during the test run. At the same time point means that this time point lies at the same distance from the corresponding application start 52, by the same time span, as the measured time point of the reference value from the test application start, which value is to be compared. If a measured pressure value or an entire pressure curve 64, 66 deviates too greatly from the comparable reference value or the comparable reference curve, this is an indication that the apparatus 10 must be subjected to review. In this regard, a signal device, not shown in the drawing, is provided, which device represents a degree of the deviation and suggests suitable measures to the user, such as carrying out more precise monitoring, for example, or shutting the apparatus down for the purpose of review or maintenance.

In summary, the following should be stated: The invention relates to, among other things, a method for monitoring an apparatus 10 for application of an at least two-component viscous material onto workpieces, which apparatus has a metering unit 12 having a number of metering valves 18 that corresponds to the number of components of the viscous material, as well as a static mixer 14 for blending the components, detachably attached to the metering unit 12, wherein the static mixer 14 has a material inlet 30 that faces the metering unit 12 and a material outlet 32 that faces away from the metering unit 12, and wherein each metering valve 18 has a supply channel 48 that can be closed off at a valve seat 22, for supplying the corresponding component to the static mixer 14, wherein a number of material applications are carried out, one after the other, which applications have an identical, predetermined time progression between an application start 52 and an application end 62, in each instance, wherein the material applications are preceded by at least one test run, during which material is dispensed by the metering unit 12 and applied to a test workpiece, for example, and which run has the same time progression between a test application start and a test application end as the material applications, and during which test run the pressure is measured and documented in at least one of the supply channels 48, by means of a pressure sensor 50, at multiple predetermined measurement time points between the test application start and the test application end, and wherein the pressure in the same supply channel 48 is measured during the material applications, between the application start 52 and the application end 62, at the same predetermined time points as in the test run, and the measured pressure values of the material applications are compared with the corresponding measured pressure values of the test run.

The invention claimed is:

1. A method for monitoring an apparatus (10) for application of an at least two-component viscous material onto workpieces, the method comprising:

providing the apparatus, wherein the apparatus has a metering unit (12) having a number of metering valves (18) that corresponds to the number of components of the viscous material, as well as a static mixer (14) for blending the components, detachably attached to the metering unit (12), wherein the static mixer (14) has a material inlet (30) that faces the metering unit (12) and a material outlet (32) that faces away from the metering unit (12), and wherein each metering valve (18) has a supply channel (48) that can be closed off at a valve seat (22), for supplying the corresponding component to the static mixer (14), carrying out a number of material applications, one after the other, wherein the applications have an identical, predetermined time progression between an application start (52) and an application end (62), in each instance, measuring, during the material applications, the pressure in at least one of the supply channels (48), using a pressure sensor (50), at predetermined time points between the application start (52) and the application end (62).

2. The method according to claim 1, wherein the measured pressure values of the material applications are compared with stored reference values.

3. The method according to claim 2, wherein the material applications are preceded by at least one test run, during which material is dispensed by the metering unit (12) and applied to a test workpiece, for example, and which run has the same time progression between a test application start and a test application end as the material applications, and during which run the pressure is measured and documented at the same predetermined measurement time points as in the case of the material applications, in at least one of the supply channels (48), between the test application start and the test application end, by means of a pressure sensor (50), and wherein the measured pressure values of the material applications are compared with the corresponding measured pressure values of the test run.

4. The method according to claim 3, wherein during the test run, the pressure is measured and documented in each of the supply channels (48), at multiple predetermined measurement points between the test application start and the test application end, by means of a pressure sensor (50), in each instance, and wherein the pressure is measured in each supply channel (48) at the same predetermined time points as in the test run, between the application start (52) and the application end (62), and for each of the supply channels (48), the measured pressure values of the material applications are compared with the corresponding measured pressure values of the test run.

5. The method according to claim 3, wherein the pressure in the corresponding supply channel (48) is measured at discrete time points, in each instance, during the test run and during the material application.

6. The method according to claim 5, wherein the pressure in the corresponding supply channel (48) is measured at constant time intervals, in each instance, during the test run and during the material application.

7. The method according to claim 1, wherein the pressure in the corresponding supply channel (48) is measured continuously during the test run and/or during the material application.

8. The method according to claim 1, wherein the pressure in the corresponding supply channel (48) is measured ahead of the valve seat (22) in the flow direction of the component in question.

9. The method according to claim 1, wherein a signal device generates a warning signal if one or more measured pressure values of a material application deviate(s) from the corresponding reference value(s) or from the measured pressure value(s) of the test run by more than a predetermined tolerance.

10. The method according to claim 9, wherein the warning signal is varied as a function of the size of the deviation.

* * * * *